US005989353A

United States Patent [19]

Skee et al.

[11] Patent Number: 5,989,353

[45] Date of Patent: Nov. 23, 1999

[54] CLEANING WAFER SUBSTRATES OF METAL CONTAMINATION WHILE MAINTAINING WAFER SMOOTHNESS

[75] Inventors: David C. Skee, Bethlehem, Pa.; George Schwartzkopf, Franklin Township, N.J.

[73] Assignee: Mallinckrodt Baker, Inc., Phillipsburg, N.J.

[21] Appl. No.: 08/729,565

[22] Filed: Oct. 11, 1996

[51] Int. Cl.[6] .............................. C03C 23/00; B08B 7/00; C11D 9/00; C11D 17/00

[52] U.S. Cl. ...................................... 134/2; 134/6; 134/36; 134/42; 510/175; 510/165; 510/167; 510/421; 510/435

[58] Field of Search .............................. 134/2, 6, 36, 42; 510/175, 421, 435, 165, 167

[56] References Cited

U.S. PATENT DOCUMENTS

| | | | |
|---|---|---|---|
| 4,462,871 | 7/1984 | Siegel | 204/1 T |
| 4,675,125 | 6/1987 | Sturwold | 252/118 |
| 5,098,594 | 3/1992 | Doscher | 252/162 |
| 5,139,607 | 8/1992 | Ward et al. | 156/655 |
| 5,348,893 | 9/1994 | Yamagishi | 437/10 |

FOREIGN PATENT DOCUMENTS

| | | | |
|---|---|---|---|
| 0723205 | 1/1994 | European Pat. Off. | G03F 7/42 |
| 0578507 | 7/1996 | European Pat. Off. | G03F 7/42 |

OTHER PUBLICATIONS

Chem. Abstract 109:232701 Abstract of Chinese Patent Publication No. 86,102,808A (Dec. 2, 1987).

Chem. Abstract 111:67956 Abstract of Japanese Patent Publication No. 1–19,344 (Jan. 23, 1989).

*Primary Examiner*—Keith D. MacMillan
*Assistant Examiner*—P. Ponnalun

[57] ABSTRACT

Microelectronics wafer substrate surfaces are cleaned to remove metal contamination while maintaining wafer substrate surface smoothness by contacting the wafer substrate surfaces with an aqueous cleaning solution of an alkaline, metal ion-free base and a polyhydroxy compound containing from two to ten —OH groups and having the formula:

$$HO—Z—OH$$

wherein —Z— is —R—, $—(R^1—O)_x—R^2—$ or $—R^3(OH)_y—$, wherein or in which —R—, $—R^1—$, $—R^2—$ and $—R^3—$ are alkylene radicals containing two to ten carbon atoms, x is a whole integer of from 1 to 4 and y is a whole integer of from 1 to 8, with the proviso that the number of carbon atoms in the polyhydroxy compound does not exceed ten, and wherein the water present in the aqueous cleaning solution is at least about 40% by weight of the cleaning composition.

16 Claims, No Drawings

CLEANING WAFER SUBSTRATES OF METAL CONTAMINATION WHILE MAINTAINING WAFER SMOOTHNESS

FIELD OF THE INVENTION

This invention relates to hydrogen peroxide-free cleaners for use in the microelectronics industry for cleaning integrated circuit substrates, more particularly for cleaning wafer surfaces, of metal contamination while maintaining wafer surface smoothness. By the process of this invention, cleaners free of hydrogen peroxide can clean such wafer surfaces without undue etching thereof and without requiring further reagents such as HF to remove oxides from the wafer surfaces.

BACKGROUND OF THE INVENTION

The cleaning of integrated circuit (IC) substrates, such as silicon wafers, with metal-free alkaline solutions to remove organic and metal contamination is widely practiced. One commonly used alkaline solution of this type is known as SC-1 or RCA-1 and comprises a hot aqueous mixture of ammonium hydroxide, hydrogen peroxide, and water (1:1:5 of 30% $H_2O_2$, 28% $NH_4OH$ and $H_2O$) to remove organic impurities and copper contamination from a wafer surface. Various cleaning tasks can be accomplished with SC-1, among these, the cleaning of silicon wafers immediately after their fabrication, the cleaning of such wafers immediately prior to gate oxide growth, the removal of oxide etch residues later in the IC processing sequence, and selective etching and resist particulate removal.

Treatment of the wafer surfaces with the hot SC-1 or RCA-1 solution is generally followed by a hot acid solution known as SC-2 or RCA-2 to remove metals untouched by the SC-1 or RCA-1 solution. This hot acid solution SC-2 comprises hydrogen peroxide, hydrochloric acid and water (1:1:5 of 30% $H_2O_2$, 37% HCl and $H_2O$).

Both solutions, SC-1 and SC-2 contain hydrogen peroxide. The purpose of the hydrogen peroxide is to protect the silicon metal from exposure to strong acids or bases by continuously forming a protective oxide layer in order to prevent etching or roughening of the silicon surface.

It is, however, necessary for the wafer surfaces to be oxide-free to be suitable for further processing where an oxide surface is not wanted. Usually, it is then necessary to remove the protective oxide layer formed by the hydrogen peroxide in the cleaning solutions. As an example of a material commonly used to remove such protective oxide layer, there may be mentioned HF.

The presence of hydrogen peroxide in the formulations imparts an inherent instability to these solutions. Such solutions typically exhibit peroxide half-lives of less than one hour at 70° C. The hydrogen peroxide in the SC-1 solution in the presence of certain metals, particularly copper and iron, becomes unstable and decomposes in rapid exothermic fashion leading to potentially dangerous conditions. The hydrogen peroxide has a low tolerance for metal contamination. Additionally, the decomposed hydrogen peroxide drops the concentration of the hydrogen peroxide leading to the possibility of silicon etching producing wafers that are not acceptable for IC manufacture. Thus, the decomposed hydrogen peroxide needs to be replenished and this changes the solution composition thereby varying the cleaning properties of the solution. In addition, the inherently high pH of the hydrogen peroxide solution presents undesirable safety and environmental concerns.

Since the introduction of the SC-1 or RCA-1 solution, there have been proposals for using basic materials other than ammonium hydroxide to clean wafer surfaces. For example, quaternary ammonium hydroxide compounds, such as tetramethyl-ammonium hydroxide (TMAH) or trimethyl-2-hydroxyethyl ammonium hydroxide (choline) have been reported in Japanese Patent Publications No. 3-93229 and 63-114132; U.S. Pat. Nos. 4,239,661; 4,964,919 and 5,259,888 and European Patent Publication No. 496605, for example. It is to be noted that the wafer roughness values mentioned in U.S. Pat. No. 4,964,919 are unacceptable for high density integrated circuit manufacture. Moreover, U.S. Pat. No. 5,207,866 describes a case where a quaternary amine without hydrogen peroxide present is used to anisotropically etch the silicon 100 face of wafers.

Without hydrogen peroxide present, none of the above mentioned alkaline or quaternary ammonium hydroxide-based cleaners can produce the wafer smoothness levels necessary for high density integrated circuit manufacture. Recently two technologies have been disclosed that permit cleaning without the use of hydrogen peroxide while maintaining acceptable roughness levels. In U.S. Pat. No. 5,466,389, the cleaning compositions contain a nonionic surfactant and a component to reduce or control the pH within the range of about pH 8 to about pH 10. In U.S. Pat. No. 5,498,293, the cleaning compositions contain an amphoteric surfactant. In both cases, wafer smoothness is maintained without the use of hydrogen peroxide.

While these new technologies can be used to clean wafer substrates without the use of hydrogen peroxide, both methods involve the introduction of organic surfactants to the cleaner formulation. These organic components could ultimately be absorbed onto or left on the wafer surface as residual matter. Organic contamination is a serious issue in the manufacture of a semiconductor device. The presence of organic contaminants on the surface of a silicon wafer can lead to the formation of silicon carbide when a thermal treatment, such as the growth of a thermal oxide, is carried out on a wafer. Silicon carbide may then be incorporated into the crystal substrate and cause defects in the crystal lattice. These crystal defects act as carrier (electron) traps that cause premature breakdown of the gate oxide and therefore cause the failure of the semiconductor device. Inorganic contaminates can also be deposited along with the organic contaminates on the surface, which also leads to the premature breakdown of the dielectric gate oxide. Organic contamination also prevents the removal of any underlying native oxide. This leads to incomplete oxide removal during a subsequent treatment to remove the oxide and would lead to an increase in microroughness and uneven gate oxide regrowth. Any increase in microroughness causes an uneven interface to result when a thin oxide or some other layer is formed in contact with the substrate and may result in decreased film integrity. Deviations in the thickness of these layers can seriously affect device performance or even lead to the failure of the device. Other negative effects associated with organic contamination that have been reported are; unintended hydrophobization, increased deposition of particles, unintended counterdoping, prevention of silicon wafer bonding, prevention of classical bonding, decreased metal pad adhesion, corrosion, chemical carryover, and image formation on wafers.

Several methods have been used to remove such residual organic contamination. One method uses ozonized ultrapure water but this involves additional steps and requires special equipment to generate the ozonized water (S. Yasui, et. al., Semiconductor Pure Water and Chemicals Conference Proceedings, pp 64–74, 1994). Clearly, it would be advantageous to avoid use of organic surfactants during the initial "front end" cleaning of semiconductor wafer surfaces.

Surfactants and other alkaline organic solutions containing alkane diols have been used for stripping photoresists in the past. Photoresist stripping involves the removal of various residues from metal or dielectric integrated circuit elements. In U.S. Pat. No. 4,744,834 (N-methylpyrrolidone derivative or glycol ether required), U.S. Pat. No. 5,091,103 (N-methylpyrrolidone required), U.S. Pat. No. 4,770,713 (amide solvent required), and U.S. Pat. No. 5,139,607 (cosolvents required), various additional solvents are required to produce the desired stripping action. In the case involving cleaning of silicon wafers, the potential organic contamination by these cosolvents would be highly undesirable.

Surfactants and other organics are used in strippers and cleaners designed to remove photoresist from wafers. Photoresist is used in generating patterned metal features needed in a functional integrated circuit (IC) and is considered to be part of the "back end" processing of the wafer. Since photoresist is a polymeric organic material, it is apparent that organic contamination is less critical at this stage in the processing of the IC.

Photoresist stripping almost always involves contacting a corrosion sensitive metal circuit component with the stripper. For this reason the water content of photoresist strippers is kept to a minimum (less than 20%) to avoid corrosion. In the glycol containing formulations described in U.S. Pat. No. 4,765,844 and U.S. Pat. No. 5,102,777, no water is specified.

Several stripper formulations that have been disclosed (U.S. Pat. No. 5,482,566 , U.S. Pat. No. 5,279,771 , U.S. Pat. No. 5,381,807 , and U.S. Pat. No. 5,334,332) that require the presence of hydroxylamine. This component is included to reduce the corrosive action of the highly alkaline formulations that are claimed. The use of strongly reducing media for this purpose has been published (Schwartzkopf, et. al., EP Patent Application 647,884, Apr. 12, 1995). The use of hydroxylamine for cleaning wafer substrates would be detrimental since the highly reducing medium would convert the metal impurities D to less soluble reduced forms which may in turn be deposited onto the silicon surface as elemental metals.

It is an object of this invention to provide a cleaning solution for cleaning wafer substrates of metal contamination without increasing surface microroughness, which cleaner composition does not require the use of hydrogen peroxide to provide a protective oxide layer, or the use of organic surfactants. A further object of this invention is to provide a cleaner composition for cleaning wafer substrates of metal contamination without increasing surface microroughness and leaving an essentially oxide-free wafer surface, making the surface suitable for further processing where an oxide surface is not wanted. A still further object of this invention is to clean such wafer surfaces of metal contamination without requiring an acid treatment step or the use of materials, such as HF, used to remove oxide surfaces. An additional aspect of this invention is to provide a process for cleaning such wafer surfaces of metal contamination by using only a single cleaning solution without increasing wafer surface microroughness. Yet another object of this invention is to provide a process and composition for cleaning such wafer surfaces of metal contamination without increasing wafer surface microroughness using an aqueous alkaline solution, and more particularly, using an aqueous quaternary ammonium hydroxide solution free of both hydrogen peroxide or other oxidizing agents and organic surfactants. Yet another object of this invention is to provide such a process and alkaline cleaning composition for cleaning wafers and producing a roughness of less than about 25 Angstroms as the average distance in the Z direction between wafer peak heights and valleys.

BRIEF SUMMARY OF THE INVENTION

A process for cleaning microelectronic wafer substrate surfaces in order to remove metal contamination without increasing surface microroughness, using hydrogen peroxide-free, aqueous cleaning solutions comprising an alkaline, metal ion-free base and a polyhydroxy compound containing from two to ten —OH groups and having the formula:

$$HO-Z-OH$$

wherein $-Z-$ is $-R-$, $-(R^1-O)_x-R^2-$ or

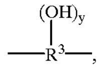

wherein or in which —R—, —$R^1$—, —$R^2$— and —$R^3$— are alkylene radicals, x is a whole integer of from 1 to 4 and y is a whole integer of from 1 to 8, with the proviso that the number of carbon atoms in the compound does not exceed ten, comprises contacting the wafer substrate surface with the cleaning solution for a time and at a temperature sufficient to clean the wafer substrate surface. The cleaning compositions optionally contain a metal complexing agent. It has been discovered that such hydrogen peroxide-free aqueous alkaline cleaning compositions produce effective wafer cleaning action against metal contamination without producing undesirable wafer surface roughness. As the data in the following examples demonstrates, cleaner compositions containing only the alkaline base alone are unable to produce effective cleaning while maintaining wafer smoothness, i.e. a Z-range roughness of 25 Angstroms or less.

DETAILED DESCRIPTION OF THE INVENTION

The aqueous, alkaline cleaning compositions used in the process of this invention generally comprise an alkaline component in an amount of up to about 25% by weight, generally from about 0.05 to about 10% by weight, and a polyhydroxy compound containing from two to ten —OH groups and having the formula:

$$HO-Z-OH$$

wherein $-Z-$ is $-R-$, $-(R^1-O)_x-R^2-$ or

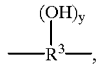

in which —R—, —$R^1$—, —$R^2$— and —$R^3$— are alkylene radicals having two to ten carbon atoms, x is a whole integer of from 1 to 4 and y is a whole integer of from 1 to 8, with the proviso that the number of carbon atoms in the compound does not exceed ten, in an amount of up to about 50% by weight, generally from about 1% to about 45% by weight, and preferably about 5% to about 40% by weight of the total cleaner composition. The remaining balance of the cleaner composition being made up of water, preferably high purity deionized water. Optionally, the alkaline cleaning compositions used in this invention may contain up to about 5%, preferably up to about 2%, by weight of a metal complexing agent.

Any suitable alkaline component may be used in the cleaner compositions of this invention. The alkaline components of these cleaners are preferably quaternary ammonium hydroxides, such as tetraalkyl ammonium hydroxides wherein the alkyl group is an unsubstituted alkyl group or an alkyl group substituted with a hydroxy and alkoxy group, generally of from 1 to 4 carbon atoms in the alkyl or alkoxy group. The most preferable of these alkaline materials are tetramethyl ammonium hydroxide and trimethyl-2-hydroxyethyl ammonium hydroxide (choline). Examples of other usable quaternary ammonium hydroxides include: trimethyl-3-hydroxypropyl ammonium hydroxide, trimethyl-3-hydroxybutyl ammonium hydroxide, trimethyl-4-hydroxybutyl ammonium hydroxide, triethyl-2-hydroxyethyl ammonium hydroxide, tripropyl-2-hydroxyethyl ammonium hydroxide, tributyl-2-hydroxyethyl ammonium hydroxide, dimethylethyl-2-hydroxyethyl ammonium hydroxide, dimethyldi(2-hydroxyethyl) ammonium hydroxide, monomethyltri(2-hydroxyethyl) ammonium hydroxide, tetraethyl ammonium hydroxide, tetrapropyl ammonium hydroxide, tetrabutyl ammonium hydroxide, monomethyltriethyl ammonium hydroxide, monomethyltripropyl ammonium hydroxide, monomethyltributyl ammonium hydroxide, monoethyltrimethyl ammonium hydroxide, monoethyltributyl ammonium hydroxide, dimethyldiethyl ammonium hydroxide, dimethyldibutyl ammonium hydroxide, and the like and mixtures thereof.

Other alkaline components are also operable including, for example, ammonium hydroxide, alkanolamines such as 2-aminoethanol, 1-amino-2-propanol, 1-amino-3-propanol, 2-(2-amino-ethoxy)ethanol, 2-(2-aminoethylamino)ethanol, other oxygen-containing amines such as 3-methoxypropylamine and morpholine, and alkane diamines such as 1,3-pentanediamine and 2-methyl-1,5-pentanediamine and the like, and other strong organic bases such as guanidine. Mixtures of these alkaline components, particularly ammonium hydroxide, with the aforementioned tetraalkyl ammonium hydroxides are also useful and are generally preferred.

The aqueous alkaline cleaner compositions of this invention contains any suitable polyhydroxy components of the aforedescribed formula HO—Z—OH, preferably a highly hydrophilic alkane diol with a Hansen hydrogen bonding solubility parameter greater than 7.5 $cal^{1/2}cm^{3/2}$ or vicinal alkane polyol. Among the various alkane diols useful in the cleaner compositions of this invention, there may be mentioned, for example, ethylene glycol, diethylene glycol, triethylene glycol, tetraethylene glycol, propylene glycol, dipropylene glycol, tripropylene glycol, tetrapropylene glycol, 2-methyl-2,4-pentanediol, and mixtures thereof. Among the various vicinal alkane polyols (sugar alcohols) useful in the cleaner compositions of this invention, there may be mentioned, for example, mannitol, erythritol, sorbitol, xylitol, adonitol, glycerol, and mixtures thereof.

The protection of silicon surfaces with hydrophilic solvents is surprising since the literature indicates that phobic materials are required for this type of protection. For example, S. Raghavan, et. al., J. Electrochem. Soc., 143 (1), 1996, p 277–283, show in their Table III that surface roughness of silicon varies directly with the hydrophilicity of certain surfactants. The more philic surfactants gave the roughest surfaces.

The cleaning solutions of this invention can be used as is or formulated with additional components such as any suitable metal chelating agents to increase the capacity of the formulation to retain metals in solution. Typical examples of chelating agents for this purpose are the following organic acids and their salts: ethylenediaminetetraacetic acid (EDTA), ethylenediaminetetraacetic acid di-N-oxide (EDTA dioxide), butylenediaminetetraacetic acid, cyclohexane-1,2-diaminetetraacetic acid, diethylenetriaminepentaacetic acid, ethylenediaminetetrapropionic acid, (hydroxyethyl)-ethylenediaminetriacetic acid (HEDTA), triethylenetetranitrilohexaacetic acid (TTHA), ethylenediiminobis[(2-hydroxyphenyl)acetic acid] (EHPG), methyliminodiacetic acid, propylenediaminetetraacetic acid, nitrolotriacetic acid (NTA), citric acid, tartaric acid, gluconic acid, saccharic acid, glyceric acid, oxalic acid, phthalic acid, benzoic acid, maleic acid, mandelic acid, malonic acid, lactic acid, salicylic acid, catechol, 4-aminoethylcatechol, [3-(3,4-dihydroxyphenyl)-alanine] (DOPA), hydroxyquinoline, N,N,N',N'-ethylenediamine-tetra(methylenephosphonic) acid, amino(phenyl) methylenediphosphonic acid, thiodiacetic acid, salicylhydroxamic acid, and the like.

In the cleaner compositions used in the process of this invention, the alkaline component will generally be present in an amount of up to about 25% by weight of the composition, generally in an amount of from about 0.05 to about 10% by weight, and preferably in an amount of from about 0.1 to about 5% by weight. The alkane diol will generally be present in an amount of up to about 50% by weight, generally in an amount of from about 1% to about 45% by weight, and preferably in an amount of from about 5 to about 40%.

If a metal chelating compound is included in the cleaner compositions, the metal chelating agent may be present in an amount up to about 5%, generally in an amount of from about 0.01 to about 5% and preferably in an amount of from about 0.1% to about 2% by weight. The remaining balance of the cleaner composition being made up of water, preferably high purity deionized water.

The water content of the cleaning formulations of this invention is always at least 40% by weight to facilitate the removal of the metal contaminants that are present.

The cleaning compositions of this invention may additionally contain a buffer component, such as acetic acid, hydrogen chloride or the like, to maintain pH control of the compositions, if desired.

As an example of a preferred cleaning composition of this invention, there may be mentioned, for example, an aqueous solution containing about 0.07% by weight tetramethylammonium hydroxide (TMAH), about 0.50% by weight ammonium hydroxide, about 36% by weight of diethylene glycol and about 0.09% by weight ethylenediaminetetraacetic acid (EDTA), the remaining balance of the cleaning composition being made up of water.

A further example of a preferred cleaning composition of this invention comprises an aqueous solution containing about 0.07% by weight tetramethylammonium hydroxide, about 2.5% by weight of ammonium hydroxide, about 35% by weight of ethylene glycol or diethylene glycol, about 0.08% by weight of glacial acetic acid, and about 0.09% by weight ethylenediaminetetraacetic acid, the remaining balance of the cleaning composition being made up of water.

A still further example of a preferred cleaning composition of this invention comprises an aqueous solution containing about 0.5% by weight tetramethylammonium hydroxide, about 4% by weight of 1,3-pentanediamine, about 50% by weight of diethylene glycol, about 1% by weight of acetic acid, and about 0.09% by weight ethylenediaminetetraacetic acid, the remaining balance of the cleaning composition being made up of water.

Yet another example of a preferred cleaning composition of this invention comprises an aqueous solution containing about 0.5% by weight tetramethylammonium hydroxide, about 4% by weight of 1,3-pentanediamine, about 50% by weight of diethylene glycol, about 0.6% by weight of hydrogen chloride, and about 0.09% by weight ethylenediaminetetraacetic acid, the remaining balance of the cleaning composition being made up of water.

The invention is illustrated, but not limited to the following examples. In the examples, the percentages are by weight unless specified otherwise. The examples illustrate the surprising and unexpected result of this invention in cleaning wafer surfaces and preventing microroughness without an oxidant such as hydrogen peroxide or a protective surfactant and in achieving low metal levels without an acid treatment step.

In the following examples, the cleaner compositions were all prepared in polyethylene or polytetrafluoroethylene containers. New 3" double-sided polished silicon wafers (P doped, <100> crystal face) were placed in cleaner solutions for ten minutes at the stated temperatures. After ten minutes in the cleaning solutions, the wafers were removed, rinsed in deionized water and analyzed. After treatment, the "$R_Z$ roughness" (defined as the average distance in the Z direction between peak heights and valleys) was measured for each cleaner composition. Metal levels were determined using a combination of droplet surface etching and graphite furnace atomic absorption spectrometry. Roughness measurements were made with either an atomic force microscope or a profilometer, such as a Tencor Alpha step 100.

EXAMPLE 1

Aqueous solutions of tetramethylammonium hydroxide (TMAH) with and without glycols were prepared. Wafers were placed in these solutions for 10 minutes at 60° C., removed, and rinsed with deionized water. After drying, the "$R_Z$ roughness" was measured. The results, set forth in Table 1, clearly show the ability of glycols to prevent or moderate the roughening of silicon surfaces that accompanies exposure to alkaline solutions. All of the cleaning solutions listed below have pH>12.

TABLE 1

Effect of Glycols on TMAH Cleaners at 60° C.

| Comparative TMAH Solutions without Glycols | | TMAH Formulation Containing Glycols | | |
|---|---|---|---|---|
| Wt. % TMAH | Avg. $R_z$ Roughness (Å) | Glycol | Wt. % Glycol | Avg. $R_z$ Roughness (Å) |
| 0.10 | 675 | Diethylene Glycol | 36 | <25 |
| 0.50 | 750 | Diethylene Glycol | 36 | <25 |
| 1.0 | 650 | Diethylene Glycol | 36 | <25 |
| 2.0 | 2,550 | Diethylene Glycol | 36 | <25 |
| 3.0 | 1,250 | Diethylene Glycol | 36 | 375 |
| 3.0 | 1,250 | Triethylene Glycol | 36 | <25 |

TABLE 1-continued

Effect of Glycols on TMAH Cleaners at 60° C.

| Comparative TMAH Solutions without Glycols | | TMAH Formulation Containing Glycols | | |
|---|---|---|---|---|
| Wt. % TMAH | Avg. $R_z$ Roughness (Å) | Glycol | Wt. % Glycol | Avg. $R_z$ Roughness (Å) |
| 4.0 | 1,175 | Diethylene Glycol | 36 | <25 |
| 4.0 | 1,175 | Triethylene Glycol | 36 | <25 |

EXAMPLE 2

The wafers for this example were treated in the same manner as Example 1 except that the cleaning temperature was 70° C. The results, set forth in Table 2, clearly show the capability of glycols to prevent or moderate the roughening of silicon surfaces that accompanies exposure to alkaline solutions. All of the solutions listed below have pH>12.

TABLE 2

Effect of Glycols on TMAH Cleaners at 70° C.

| Comparative TMAH Solutions without Glycols | | TMAH Formulation Containing Glycols | | |
|---|---|---|---|---|
| Wt. % TMAH | Avg. $R_z$ Roughness (Å) | Glycol | Wt. % Glycol | Avg. $R_z$ Roughness (Å) |
| 0.10 | 4,250 | Diethylene Glycol | 36 | <25 |
| 0.50 | 5,700 | Diethylene Glycol | 36 | 50 |

EXAMPLE 3

Wafers for this example were treated in the same manner as Example 1 except that the cleaning temperature was 80° C. The results, set forth in Table 3, clearly show the capability of glycols to prevent or moderate the roughening of silicon surfaces that accompanies exposure to alkaline solutions. The solutions listed below have pH>12.

TABLE 3

Effect of Glycols on TMAH Cleaners at 80° C.

| Comparative TMAH Solutions without Glycols | | TMAH Formulation Containing Glycols | | |
|---|---|---|---|---|
| Wt. % TMAH | Avg. $R_z$ Roughness (Å) | Glycol | Wt. % Glycol | Avg. $R_z$ Roughness (Å) |
| 0.01 | 825 | Diethylene Glycol | 36 | <25 |
| 0.05 | 5,200 | Diethylene Glycol | 36 | <25 |
| 0.10 | 10,000 | Diethylene Glycol | 36 | 375 |
| 0.50 | 18,000 | Diethylene Glycol | 36 | 175 |

EXAMPLE 4

Wafers for this example were treated in the same manner as Example 1 except that the cleaning temperature was 90°

C. The results, set forth in Table 4, clearly show the capability of glycols to prevent or moderate the roughening of silicon surfaces that accompanies exposure to alkaline solutions. The solutions listed below have pH>12.

TABLE 4

Effect of Glycols on TMAH Cleaners at 90° C.

| Comparative TMAH Solutions without Glycols | | TMAH Formulation Containing Glycols | | |
|---|---|---|---|---|
| Wt. % TMAH | Avg. $R_z$ Roughness (Å) | Glycol | Wt. % Glycol | Avg. $R_z$ Roughness (Å) |
| 0.10 | 10,750 | Diethylene Glycol | 36 | <25 |
| 0.50 | 2,250 | Diethylene Glycol | 36 | 375 |

EXAMPLE 5

The wafers for this example were treated in the same manner as Example 1 except that the cleaning temperature was 70° C. and the concentration of the glycols were varied from 6.5–36 weight percent. The results, set forth in Table 5, clearly show the capability of glycols to prevent or moderate the roughening of silicon surfaces that accompanies exposure to alkaline solutions. All of the solutions listed below have pH>12.

TABLE 5

Effect of Glycols on TMAH Cleaners at 70° C.

| Comparative TMAH Solutions without Glycols | | TMAH Formulation Containing Glycols | | |
|---|---|---|---|---|
| Wt. % TMAH | Avg. $R_z$ Roughness (Å) | Glycol | Wt. % Glycol | Avg. $R_z$ Roughness (Å) |
| 0.30 | 4,250 | Diethylene Glycol | 36 | <25 |
| 0.30 | 3,500 | Diethylene Glycol | 22 | 300 |
| 0.30 | 3,500 | Diethylene Glycol | 12 | 575 |
| 0.30 | 3,500 | Diethylene Glycol | 6.5 | 1100 |
| 0.30 | 6,600 | Triethylene Glycol | 12 | <25 |
| 0.30 | 6,600 | 2-Methyl-2,4-pentanediol | 10 | 125 |
| 0.30 | 6,600 | Tripropylene Glycol | 11 | <25 |

EXAMPLE 6

The wafers for this example were treated in the same manner as Example 1 except that the cleaning temperature was 60° C. and a variety of alkaline cleaning components including: tetraethyl-ammonium hydroxide (TEAH), choline (2-hydroxyethyltrimethylammonium hydroxide), monoethanolamine (MEA) and ammonium hydroxide ($NH_4OH$) were used. The results are set forth in Table 6 for an alkaline component concentration of 1.3 weight percent and a glycol concentration of 36 weight percent respectively, with treatment conditions of 60° C. for ten minutes. Each of the four alkaline materials etched silicon if the glycol was omitted. When the glycol was present, however, there were no signs of etching for any of the treatments.

TABLE 6

Effect of Glycols on Alkaline Cleaners at 60° C.

| Alkaline Component without Glycols (1.3 Wt. %) | | Alkaline Formulation Containing Glycols | | |
|---|---|---|---|---|
| Alkaline Component | Avg. $R_z$ Roughness (Å) | Glycol | Wt. % Glycol | Avg. $R_z$ Roughness (Å) |
| TEAH | 750 | Diethylene Glycol | 36 | <25 |
| Choline | 375 | Diethylene Glycol | 36 | <25 |
| Ammonium Hydroxide | 3000 | Diethylene Glycol | 36 | <25 |
| MEA | 375 | Diethylene Glycol | 36 | <25 |

EXAMPLE 7

The wafers for this example were treated in the same manner as Example 1 except that the cleaning temperature was 80° C. and a variety of alkaline cleaning components including: 1-amino-2-propanol (MIPA), 2-(2-aminoethoxy)ethanol (DEGA), 3-amino-1-propanol (AP), 3-methoxypropylamine (MPA), 1-(2-aminoethyl)piperazine (AEP), and morpholine were used. The results are set forth in Table 7 for an alkaline component concentration of 1.3 weight percent and a glycol concentration of 36 weight percent respectively, with treatment conditions of 80° C. for ten minutes. Each of the six alkaline materials etched silicon if the glycol was omitted. When the glycol was present, however, there were no signs of etching for any of the treatments.

TABLE 7

Effect of Glycols on Alkaline Cleaners at 80° C.

| Alkaline Component without Glycols (1.3 Wt. %) | | Alkaline Formulation Containing Glycols | | |
|---|---|---|---|---|
| Alkaline Component | Avg. $R_z$ Roughness (Å) | Glycol | Wt. % Glycol | Avg. $R_z$ Roughness (Å) |
| MIPA | 2550 | Diethylene Glycol | 36 | <25 |
| DEGA | 9000 | Diethylene Glycol | 36 | ≦25 |
| AP | 13750 | Diethylene Glycol | 36 | <25 |
| MPA | 2,400 | Diethylene Glycol | 36 | <25 |
| AEP | 100 | Diethylene Glycol | 36 | <25 |
| Morpholine | 225 | Diethylene Glycol | 36 | <50 |

EXAMPLE 8

An aqueous alkaline solution concentrate containing 0.22 weight percent tetramethylammonium hydroxide (TMAH), 1.55 weight percent ammonium hydroxide, and 0.29 weight percent of the chelating agent ethylenedinitrilotetraacetic acid (EDTA) was prepared. The aqueous alkaline solution concentrate was used to prepare two solutions for treatment of samples. Alkaline solution A was prepared by adding one part deionized water and one part diethylene glycol (DEG) to one part of the concentrate prepared above. Alkaline solution B was prepared by adding two parts deionized water to one part of the concentrate prepared above. Two silicon wafer samples from the same wafer lot were subjected to the following treatment: (1) the sample was placed in a Piranha solution (96% sulfuric acid/30% hydrogen peroxide (4:1) mixture) for 10 minutes at approximately 90° C., removed, rinsed with deionized water, and dried with compressed nitrogen gas, and (2) the sample was placed in the aqueous alkaline solution A or B for a 5 minute treatment at 70° C., removed, rinsed with deionized water, and dried with compressed nitrogen gas. A third silicon wafer sample (from the same wafer lot as the above) was prepared using a "Piranha-only" treatment (as outlined in step (1) above) for comparison. The Root Mean Square (RMS) microroughness of the silicon wafer sample was determined after the treatment by Atomic Force Microscopy (AFM) from a one micron square scan with the results set forth in Table 8. Clearly, the presence of a glycol prevents the roughening of the silicon wafer surface.

TABLE 8

Effect of Glycols on Alkaline Cleaners

| Treatment | Alkaline Solution Dilution with: | RMS (Å) |
|---|---|---|
| Piranha-Only | — | 1.9 |
| (1)Piranha (2)Alkaline Solution A | Deionized Water and DEG | 1.6 |
| (1)Piranha (2)Alkaline Solution B | Deionized Water Only | 445.0 |

EXAMPLE 9

An aqueous alkaline solution concentrate containing 0.20 weight percent tetramethylammonium hydroxide (TMAH), 7.37 weight percent ammonium hydroxide, and 0.26 weight percent of the chelating agent ethylenedinitrilotetraacetic acid (EDTA) was prepared. The aqueous alkaline solution concentrate was used to prepare four solutions for treatment of samples. Buffered alkaline solution C was prepared by adding two parts diethylene glycol (DEG) to one part of the concentrate prepared above then adding 0.07 weight percent glacial acetic acid to achieve a solution pH of about 10.8. Buffered alkaline solution D was prepared by adding one part deionized water and one part ethylene glycol (EG) to one part of the concentrate prepared above then adding 0.08 weight percent glacial acetic acid to achieve a solution pH of about 10.8. Buffered alkaline solution E was prepared by adding one part deionized water and one part tetra-ethylene glycol (TaEG) to one part of the concentrate prepared above then adding 0.11 weight percent glacial acetic acid to achieve a solution pH of about 10.8. Buffered alkaline solution F was prepared by adding two parts deionized water to one part of the concentrate prepared above then adding 0.11 weight percent glacial acetic acid to achieve a solution pH of about 10.8. Four silicon wafer samples from the same wafer lot used in Example 8 were subjected to the following treatment: (1) the sample was placed in a Piranha solution (96% sulfuric acid/30% hydrogen peroxide (4:1) mixture) for 10 minutes at approximately 90° C., removed, rinsed with deionized water, and dried with compressed nitrogen gas, and (2) the sample was placed in the buffered aqueous alkaline solution C or D or E or F for a 5 minute treatment at 70° C., removed, rinsed with deionized water, and dried with compressed nitrogen gas. The Piranha-Only roughness data from Table 8 is also shown here for comparison. The Root Mean Square (RMS) microroughness of the silicon wafer sample was determined after the treatment by Atomic Force Microscopy (AFM) from a one micron square scan with the results set forth in Table 9. Clearly, the presence of a glycol prevents or moderates the roughening of the silicon wafer surface.

TABLE 9

Effect of Glycols on Buffered Alkaline Cleaners

| Treatment | Treatment Time at 70° C. (minutes) | Buffered Alkaline Solution Dilution with: | RMS (Å) |
|---|---|---|---|
| Piranha-Only | — | — | 1.9 |
| (1)Piranha (2)Alkaline Solution C | 5 | DEG Only | 2.0 |
| (1)Piranha (2)Alkaline Solution D | 5 | Deionized Water and EG | 2.1 |
| (1)Piranha (2)Alkaline Solution E | 5 | Deionized Water and TaEG | 73.2 |
| (1)Piranha (2)Alkaline Solution F | 5 | Deionized Water Only | 129.6 |

EXAMPLE 10

An aqueous alkaline solution concentrate containing 0.20 weight percent tetramethylammonium hydroxide (TMAH), 7.37 weight percent ammonium hydroxide, and 0.26 weight percent of the chelating agent ethylenedinitrilotetraacetic acid (EDTA) was prepared. The aqueous alkaline solution concentrate was used to prepare two solutions for treatment of samples. Buffered alkaline solution G was prepared by adding one part deionized water and one part diethylene glycol (DEG) to one part of the concentrate prepared above then adding 0.12 weight percent glacial acetic acid to achieve a solution pH of about 10.8. Buffered alkaline solution F was prepared by adding two parts deionized water to one part of the concentrate prepared above then adding 0.11 weight percent glacial acetic acid to achieve a solution pH of about 10.8. Two silicon wafer samples from the same wafer lot used in Examples 8 and 9 were subjected to the following treatment: (1) the sample was placed in a Piranha solution (96% sulfuric acid/30% hydrogen peroxide (4:1) mixture) for 10 minutes at approximately 90° C., removed, rinsed with deionized water, and dried with compressed nitrogen gas, and (2) the sample was placed in the buffered aqueous alkaline solution F or G for a 3 minute treatment at 70° C., removed, rinsed with deionized water, and dried with compressed nitrogen gas. The Piranha-Only roughness data from Table 8 is also shown here for comparison. The Root Mean Square (RMS) micro-roughness of the silicon wafer sample was determined after the treatment by Atomic Force Microscopy (AFM) from a one micron square scan with the results set forth in Table 10. Clearly, the presence of a glycol prevents or moderates the roughening of the silicon wafer surface.

TABLE 10

Effect of Glycols on Buffered Alkaline Cleaners

| Treatment | Treatment Time at 70° C. (minutes) | Buffered Alkaline Solution Dilution with: | RMS (Å) |
|---|---|---|---|
| Piranha-Only | — | — | 1.9 |
| (1)Piranha (2)Alkaline Solution G | 3 | Deionized Water and DEG | 2.5 |
| (1)Piranha (2)Alkaline Solution F | 3 | Deionized Water Only | 83.4 |

EXAMPLE 11

A buffered aqueous alkaline solution concentrate with a pH of about 11.0 was prepared by combining 1.03 weight percent tetramethylammonium hydroxide (TMAH), 8.63 weight percent 1,3-pentanediamine, 0.20 weight percent of the chelating agent ethylenedinitrilotetraacetic acid (EDTA) and 2.32 weight percent glacial acetic acid. The buffered aqueous alkaline solution concentrate was used to prepare two solutions for treatment of samples. Buffered alkaline solution H was prepared by adding one part diethylene glycol (DEG) to one part of the concentrate prepared above. Buffered alkaline solution I was prepared by adding one part deionized water to one part of the concentrate prepared above. Two silicon wafer samples from the same wafer lot used in Examples 8, 9 and 10 were subjected to the following treatment: (1) the sample was placed in a Piranha solution (96% sulfuric acid/30% hydrogen peroxide (4:1) mixture) for 10 minutes at approximately 90° C., removed, rinsed with deionized water, and dried with compressed nitrogen gas, and (2) the sample was placed in the buffered aqueous alkaline solution H or I for a 5 minute treatment at 70° C., removed, rinsed with deionized water, and dried with compressed nitrogen gas. The Piranha-Only roughness data from Table 8 is also shown here for comparison. The Root Mean Square (RMS) microroughness of the silicon wafer sample was determined after the treatment by Atomic Force Microscopy (AFM) from a one micron square scan with the results set forth in Table 11. Clearly, the presence of a glycol prevents or moderates the roughening of the silicon wafer surface.

TABLE 11

Effect of Glycols on Buffered Alkaline Cleaners

| Treatment | Treatment Time at 70° C. (minutes) | Buffered Alkaline Solution Dilution with: | RMS (Å) |
|---|---|---|---|
| Piranha-Only | — | — | 1.9 |
| (1)Piranha (2)Alkaline Solution H | 5 | Deionized Water and DEG | 1.9 |
| (1)Piranha (2)Alkaline Solution I | 5 | Deionized Water Only | 254.3 |

EXAMPLE 12

A buffered aqueous alkaline solution concentrate with a pH of about 11.0 was prepared by combining 1.02 weight percent tetramethylammonium hydroxide(TMAH), 8.54 weight percent 1,3-pentanediamine, 0.20 weight percent of the chelating agent ethylenedinitrilotetraacetic acid (EDTA) and 3.32 weight percent of 37.1% hydrochloric acid. The buffered aqueous alkaline solution concentrate was used to prepare two solutions for treatment of samples. Buffered alkaline solution J was prepared by adding one part diethylene glycol (DEG) to one part of the concentrate prepared above. Buffered alkaline solution K was prepared by adding one part deionized water to one part of the concentrate prepared above. Two silicon wafer samples from the same wafer lot used in Examples 8, 9, 10 and 11 were subjected to the following treatment: (1) the sample was placed in a Piranha solution (96% sulfuric acid/30% hydrogen peroxide (4:1) mixture) for 10 minutes at approximately 90° C., removed, rinsed with deionized water, and dried with compressed nitrogen gas, and (2) the sample was placed in the buffered aqueous alkaline solution J or K for a 5 minute treatment at 70° C., removed, rinsed with deionized water, and dried with compressed nitrogen gas. The Piranha-only roughness data from Table 8 is also shown here for comparison. The Root Mean Square (RMS) microroughness of the silicon wafer sample was determined after the treatment by Atomic Force Microscopy (AFM) from a one micron square scan with the results set forth in Table 12. Clearly, the presence of a glycol prevents or moderates the roughening of the silicon wafer surface.

TABLE 12

Effect of Glycols on Buffered Alkaline Cleaners

| Treatment | Treatment Time at 70° C. (minutes) | Buffered Alkaline Solution Dilution with: | RMS (Å) |
|---|---|---|---|
| Piranha-Only | — | — | 1.9 |
| (1)Piranha (2)Alkaline Solution J | 5 | Deionized Water and DEG | 1.4 |
| (1)Piranha (2)Alkaline Solution K | 5 | Deionized Water Only | 153.2 |

EXAMPLE 13

Solution A, prepared as in Example 8, was used to treat two single crystal silicon (100) Internal Reflection Elements (IRE) for determination of surface termination species and organic contamination levels by Fourier Transform Infra—Red Attenuated Total Reflectance (FTIR/ATR) spectroscopy. IRE-#1 is an undoped silicon (100) trapezoidal shaped crystal with dimensions of 54 mm×10 mm×2 mm with 45° end bevels. IRE-#1 was treated as follows: (1) the IRE was placed in a Piranha solution (96% sulfuric acid/30% hydrogen peroxide (4:1) mixture) for 10 minutes at approximately 90° C., removed, rinsed with deionized water, and dried with compressed nitrogen gas, and finally a reference absorbance spectral was taken by FTIR/ATR (2) the IRE was placed in the aqueous alkaline solution A for a 5 minute treatment at 70° C., removed, rinsed with deionized water, and dried with compressed nitrogen gas, and finally a “sample absorbance spectra” was taken by FTIR/ATR. A minimum of 480 scans were done with a gain of 32 at 4 $cm^{-1}$ resolution. The reference spectra was subtracted from the sample spectra to determine surface termination species and if organic contamination was present. IRE-#2 is a n-Phosphorus doped silicon (100) trapezoidal shaped crystal with dimensions of 54mm×10 mm×1 mm (a thinner crystal gives rise to more internal reflections and therefore has increased sensitivity) with 45° end bevels. IRE-#2 was treated as follows: (1) the IRE was placed in Piranha (96% sulfuric acid/30% hydrogen peroxide (4:1) mixture) for 10 minutes at approximately 90° C., removed, rinsed with deionized water, and dried with compressed nitrogen gas, and finally a "reference absorbance spectra" was taken by FTIR/ATR, and (2) the IRE was placed in the aqueous alkaline solution A for a 5 minute treatment at 70° C., removed, rinsed with deionized water, and dried with compressed nitrogen gas, and finally a "sample absorbance spectra" was taken by FTIR/ATR. A minimum of 480 scans were done with a gain of 32 at 4 $cm^{-1}$ resolution. The reference spectra was subtracted from the sample spectra to determine surface termination species and if organic contamination was present.

Analysis of the resulting spectra was performed on the regions 2990–2810 $cm^{-1}$ (where organic contamination CHx peaks would be located) and 2160–2035 $cm^{-1}$ (where hydrogen-terminated silicon peaks would be located). Results indicated the presence of an absorbance peak in the 2160–2035 $cm^{-1}$ range for both IRE crystals, which indicated the presence of hydrogen-termination on the surface of the silicon IRE. The absorbance region from 2990–2810 $cm^{-1}$ was analyzed for both IRE crystals and no absorbance peaks were present above background noise in this region, which indicated that there was no organic contamination (or residue) detected. Clearly, this glycol containing treatment essentially removes native silicon oxide from the surface of the silicon IRE crystals and forms a hydrogen-terminated silicon surface without leaving any organic residue behind.

EXAMPLE 14

Solution A, prepared as in Example 8, was used to clean four, n-Phosphorus doped, silicon wafers as received from the wafer manufacturer. Cleaning was for 5 minutes at 70° C. followed by a two minute deionized water rinse and spinning dry.

The metals cleaning capability of solution A was then determined by the Droplet Surface Etching (DSE) method followed by elemental analysis using Graphite Furnace Atomic Absorption Spectroscopy (GFAAS). A second set of two wafers from the same lot was also analyzed in "as received" condition to determine the initial level of metal contamination using the same DSE-GFAAS method. The DSE-GFAAS method was performed by placing a small drop of ultra-pure acid solution (10% HF and 10% HCl in water) on the surface of the wafer and "scanning" the drop across the entire wafer's surface to dissolve any silicon oxide and metals into the droplet. The droplet was then analyzed using GFAAS. The results of the DSE-GFAAS analysis for aluminum (Al), copper (Cu), and iron (Fe) are shown in Table 13. Clearly, the glycol containing aqueous alkaline solution A is capable of cleaning these metal contaminants from the wafer's surface.

TABLE 13

Metals Removal Effect of Glycol Containing Alkaline Cleaner

| Treatment | Surface Contamination Concentration for Aluminum (× $10^{10}$ atoms/ $cm^2$) | Surface Contamination Concentration for Copper (× $10^{10}$ atoms/ $cm^2$) | Surface Contamination Concentration for Iron (× $10^{10}$ atoms/ $cm^2$) |
|---|---|---|---|
| "As Received" | 150 | 11 | 720 |
| Solution A | 97 | 1.8 | 9.0 |

EXAMPLE 15

An aqueous alkaline solution concentrate containing 0.22 weight percent tetramethylammonium hydroxide (TMAH), 1.55 weight percent ammonium hydroxide, and 0.29 weight percent of the chelating agent ethylenedinitrilotetraacetic acid (EDTA) was prepared. The aqueous alkaline solution concentrate was used to prepare seven solutions for treatment of samples. Alkaline solution M was prepared by adding 1.7 parts deionized water and 0.3 parts D-mannitol to one part of the concentrate prepared above. Alkaline solution N was prepared by adding 1.4 parts deionized water and 0.6 parts meso-erythritol to one part of the concentrate prepared above. Alkaline solution O was prepared by adding 1.4 parts deionized water and 0.6 parts D-sorbitol to one part of the concentrate prepared above. Alkaline solution P was prepared by adding 1.4 parts deionized water and 0.6 parts xylitol to one part of the concentrate prepared above. Alkaline solution Q was prepared by adding 1.4 parts deionized water and 0.6 parts adonitol to one part of the concentrate prepared above. Alkaline solution R was prepared by adding 1.4 parts deionized water and 0.6 parts glycerol to one part of the concentrate prepared above. Alkaline solution S was prepared by adding 1.4 parts deionized water and 0.6 parts DL-threitol to one part of the concentrate prepared above. Seven silicon wafer samples were subjected to the following treatment: (1) the sample was placed in a Piranha solution (96% sulfuric acid/30% hydrogen peroxide (4:1) mixture) for 10 minutes at approximately 90° C., removed, rinsed with deionized water, and dried with compressed nitrogen gas, and (2) the sample was placed in the aqueous alkaline solution M or N or O or P or Q or R or S for a 5 minute treatment at 70° C., removed, rinsed with deionized water, and dried with compressed nitrogen gas. The Piranha-Only and Solution B (dilution with water only) data from Table 8 is shown here for comparison. The Root Mean Square (RMS) microroughness of the silicon wafer sample was determined after the treatment by Atomic Force Microscopy (AFM) from a one micron square scan with the results set forth in Table 14. Clearly, the presence of a sugar alcohol prevents or moderates the roughening of the silicon wafer surface.

TABLE 14

Effect of Sugar Alcohols on Alkaline Cleaners

| Treatment | Alkaline Solution Dilution with: | Wt. % Sugar Alcohol | RMS (Å) |
|---|---|---|---|
| Piranha-Only | — | — | 1.9 |
| (1)Piranha (2)Alkaline Solution B | Deionized Water Only | — | 445.0 |
| (1)Piranha (2)Alkaline Solution M | Deionized Water and D-Mannitol | 10 | 48.9 |
| (1)Piranha (2)Alkaline Solution N | Deionized Water and meso-Erythritol | 20 | 3.1 |
| (1)Piranha (2)Alkaline Solution O | Deionized Water and D-Sorbitol | 20 | 174.0 |
| (1)Piranha (2)Alkaline Solution P | Deionized Water and Xylitol | 20 | 142.4 |
| (1)Piranha (2)Alkaline Solution Q | Deionized Water and Adonitol | 20 | 116.7 |
| (1)Piranha (2)Alkaline Solution R | Deionized Water and Glycerol | 20 | 216.2 |
| (1)Piranha (2)Alkaline Solution S | Deionized Water and DL-Threitol | 20 | 5.8 |

We claim:

1. A process for cleaning a microelectronics wafer substrate surface to remove metal contamination while maintaining wafer substrate smoothness, said process comprising preparing said wafer substrate surface for generating a circuit on said wafer substrate surface so as to provide a substantially oxide-free wafer substrate surface by contacting the wafer substrate surface with a cleaning composition for a time and temperature sufficient to clean the wafer substrate surface, said cleaning composition consisting essentially of an aqueous solution of an alkaline, metal ion-free base and a polyhydroxy compound containing from two to ten —OH groups and having the formula:

$$HO—Z—OH$$

$$\text{wherein } —Z— \text{ is } —R—, \; —(R^1—O)_x—R^2— \text{ or } —\overset{(OH)_y}{\overset{|}{R^3}}—,$$

wherein or in which —R—, —$R^1$—, —$R^2$— and —$R^3$— are alkylene radicals having two to ten carbon atoms, x is a whole integer of from 1 to 4 and y is a whole integer of from 1 to 8, with the proviso that the number of carbon atoms in the polyhydroxy compound does not exceed ten, wherein the water present in the aqueous solution is at least about 40% by weight of the cleaning composition; and wherein, during the preparation of said wafer substrate surface for generating said circuit, said contacting of said wafer substrate surface with said cleaning composition is carried out without contacting said wafer substrate surface with hydrogen peroxide, and without utilizing oxide-removing reagents, prior to generating any circuit on said wafer substrate surface.

2. A process according to claim 1 wherein the alkaline, metal ion-free base is present in the cleaning composition in an amount of up to 25% by weight and the polyhydroxy compound in an amount up to about 50% by weight of the cleaning composition.

3. A process according to claim 2 wherein the alkaline, metal ion-free base is present in an amount of from about 0.05% to about 10% by weight and the polyhydroxy compound in an amount of from about 5% to about 40% by weight.

4. A process according to claim 3 wherein the cleaning composition additionally comprises a metal chelating compound in an amount of from about 0.01 to about 5% by weight of the cleaning composition.

5. A process according to claim 2 wherein the alkaline, metal ion-free base is selected from the group consisting of ammonium hydroxide, or a tetraalkyl ammonium hydroxide wherein the alkyl group is an unsubstituted alkyl group or an alkyl group substituted with a hydroxy or alkoxy radical, and mixtures thereof.

6. A process according to claim 5 wherein the alkaline, metal ion-free base is selected from the group consisting of tetramethylammonium hydroxide, tetraethylammonium hydroxide, trimethyl-2-hydroxyethyl ammonium hydroxide, ammonium hydroxide, and mixtures thereof.

7. A process according to claim 2 wherein the alkaline, metal ion-free base is an alkanolamine.

8. A process according to claim 2 wherein the alkaline, metal ion-free base is an alkane diamine.

9. A process according to claim 1 further comprising a polyhydroxy compound selected from the group consisting of a highly hydrophilic alkane diol with a Hansen hydrogen bonding solubility parameter greater than 7.5 $cal^{1/2}cm^{-3/2}$ and a vicinal alkane polyol.

10. A process according to claim 9 wherein the polyhydroxy compound is an alkane diol selected from the group consisting of ethylene glycol, diethylene glycol, triethylene glycol, tetraethylene glycol, propylene glycol, dipropylene glycol, tripropylene glycol, tetrapropylene glycol, 2-methyl-2,4-pentanediol, and mixtures thereof.

11. A process according to claim 9 wherein the vicinal alkane polyol is selected from the group consisting of mannitol, erythritol, sorbitol, xylitol, adonitol, glycerol, and mixtures thereof.

12. A process according to claim 4 wherein the cleaning composition comprises an aqueous solution containing about 0.07% by weight tetramethylammonium hydroxide, about 0.50% by weight of ammonium hydroxide solution, about 36% by weight of diethylene glycol, and about 0.09% by weight ethylenediaminetetraacetic acid, the remaining balance of the cleaning composition being made up of water.

13. A process according to claim 4 wherein the cleaning composition further comprises an aqueous solution containing about 0.07% by weight tetramethylammonium hydroxide, about 2.5% by weight of ammonium hydroxide, about 35% by weight of a glycol selected from the group consisting of ethylene glycol and diethylene glycol, about 0.08% by weight of glacial acetic acid, and about 0.09% by weight ethylenediaminetetraacetic acid, the remaining balance of the cleaning composition being made up of water.

14. A process according to claim 2 wherein the cleaning composition further comprises an aqueous solution containing about 0.5% by weight tetramethylammonium hydroxide, about 4% by weight of 1,3-pentanediamine, about 50% by weight of diethylene glycol, about 1% by weight of acetic acid, and about 0.09% by weight ethylenediaminetetraacetic acid, the remaining balance of the cleaning composition being made up of water.

15. A process according to claim 2 wherein the cleaning composition further comprises an aqueous solution containing about 0.5% by weight tetramethylammonium hydroxide, about 4% by weight of 1,3-pentanediamine, about 50% by weight of diethylene glycol, about 0.6% by weight of hydrogen chloride, and about 0.09% by weight ethylenediaminetetraacetic acid, the remaining balance of the cleaning composition being made up of water.

16. The process of claim 1, wherein after contacting said wafer substrate surface with said cleaning composition, said wafer substrate surface has peak heights and valleys with an average distance between said peak heights and valleys of less than about 25 Angstroms.

* * * * *